March 29, 1949. R. N. HALL 2,465,373
GAS TIGHT ARTICULATED JOINT FOR HOLLOW VESSELS
Filed Jan. 1, 1945
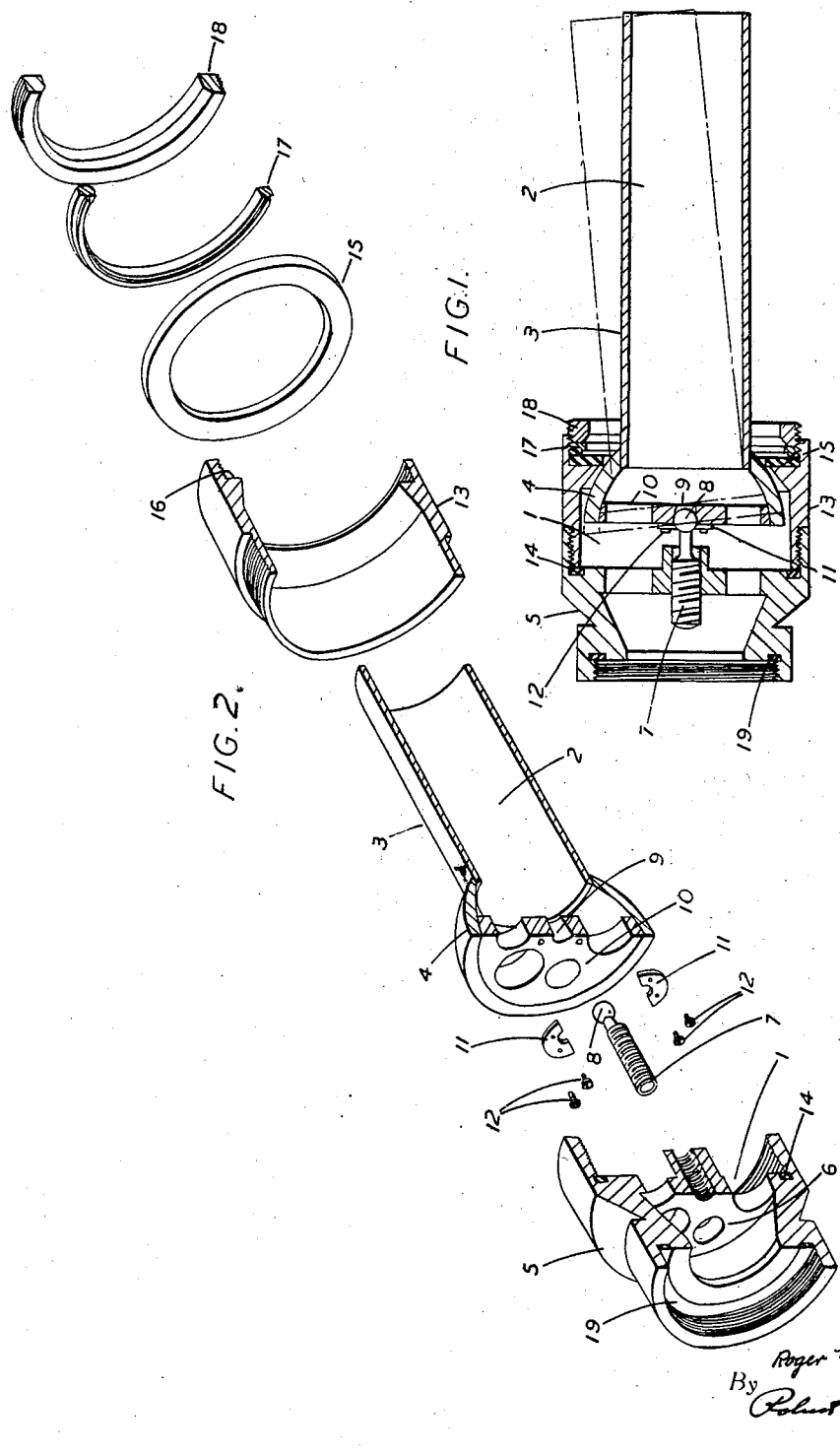
Inventor
Roger Norman Hall
By
Attorney Patented Mar. 29, 1949

2,465,373

UNITED STATES PATENT OFFICE 2,465,373

GASTIGHT ARTICULATED JOINT FOR HOLLOW VESSELS

Roger Norman Hall, London, England, assignor, by mesne assignments, to International Standard Electric Corporation, New York, N. Y., a corporation of Delaware Application January 1, 1945, Serial No. 570,940
In Great Britain January 28, 1944

10 Claims. (Cl. 285—91)

The present invention relates to gas-tight articulated joints for hollow vessels such as vacuum tubes which permit of relative movement of parts of the vessel without leaking.

In the early development of high-vacuum systems, nearly all connecting apparatus was constructed of glass. This had a number of advantages, particularly in the case with which leak-free joints could be made, the speed with which complicated systems could be built using simple tools, and the good electrical insulation obtained. The main disadvantage at first in using glass lay in its fragility. The need for skill in reassembly of systems which had frequently to be altered was a further disadvantage, but was usually regarded as inevitable whatever material might be used.

Two factors have combined to change this situation. The first is the development of modern high speed diffusion pumps. These require large diameter tubes if their speed is to be of value. In large diameters, glass is no longer easy to work, and glass taps are unusable above a certain size. The second is the development of techniques which enable all-metal systems to be jointed and joined easily even in the largest sizes. Joints can now be made, allowing of vacua down to less than $10^{-6}$ mm. of mercury, between metal tubes of any size, in which the ends have merely to be placed together, which take less time to establish even than the simple low-vacuum connection obtained by slipping a piece of rubber tube over a glass or metal one.

Large diameter tubes are particularly advantageous in continuously pumped or demountable vacuum tubes, and it is also very useful to be able to adjust an internal element from the outside of such a tube, or more generally to be able to move one part of the tube relatively to another part without loss of the vacuum.

A demountable system employing sheets of rubber for the sealing has been described by Wilson in the Review of Scientific Instruments of February, 1941. This technique is applicable to high vacuum devices constructed of metal tubes and pressures lower than $10^{-6}$ mm. of mercury are easily maintained inside the tubes. Metal rods may be sealed by similar methods through the ends of tubes, allowing for longitudinal and rotational adjustment of pistons or other elements inside the vacuum.

The present invention consists in applying this type of technique to the design of a vacuum-tight articulated joint between two metal tubes, which allows the angle between their axes to be adjusted rather widely. The joint is a large ball-and-socket joint, sealed by means of an annular sheet or washer of rubber supported at the end of one of the tubes and surrounding the other tube so as to bear externally against the ball which is at the end of that other tube.

The invention accordingly provides a gas-tight articulated joint for a vacuum or gas-filled envelope comprising a ball-and-socket joint sealed by a resilient annular washer clamped to the socket portion and adapted to be pressed upon the surface of the ball on the high pressure side by the pressure difference between the inside and outside of the envelope, and means for mutually supporting the ball and socket portions to prevent collapse of the joint under the said pressure difference.

An example of an articulated joint according to the invention is shown in longitudinal section in Fig. 1 of the accompanying drawings. An exploded view with most of the parts sectioned is shown in Fig. 2. The joint is intended for apparatus where the internal pressure is lower than the external pressure, and comprises two principal portions, namely a socket tube 1, and a ball tube 2 movable with respect to the socket tube. The ball tube 2 comprises a metal tube 3 having a hollow ball 4 attached at one end. The outside surface of the ball should be accurately spherical, and its centre should be on the axis of the tube 3.

The socket tube comprises a hollow body 5 carrying a transverse supporting spider 6 into which is screwed a rod 7 bearing on the end a small steel ball 8 which forms a universal pivot for the ball tube 2. The ball 8 engages a conical bearing 9 in a second supporting spider 10 fixed inside the hollow ball 4. The ball 8 is imprisoned in the bearing 9 by a split washer 11 fixed by screws 12 to the spider 10. The bearing 9 should be so located that the centres of the balls 4 and 8 always coincide.

The ball tube is secured inside the socket tube by a screwed ring 13 which screws into the body 5 and beds down on to a resilient washer 14 making a gas-tight seal therewith. Another resilient washer 15 is clamped to an annular bearing surface 16 on the ring 13 by means of a metal pressure washer 17 and screwed ring 18. The resilient washer 15 bears cornerwise on the outside of the hollow ball 4 and is pressed down upon its surface by the external pressure and thereby makes a gas-tight seal which holds perfectly while the ball tube is moved about in the socket tube.

The body 5 is provided with a sealing washer 19 for the purpose of making a butt seal of known type, for example with a pump tube (not shown).

The principal function of the ball 8 is to provide a thrust bearing to prevent the ball tube 2 from being driven inwards by the external pressure, and it also serves as a fixed pivot about which the ball tube is rotated. The screw 7 enables the position of the ball 4 to be precisely adjusted with respect to the washer 15.

In order to make the best seal, the central hole of the washer 15 should be of such diameter that the surface of the washer makes an angle of about 45° with the tangent cone through the circle where the corner of the washer round the central hole touches the ball 4. The washer should also be lubricated with a suitable grease with sufficiently low vapour pressure. The other washers 14 and 19 should also be similarly greased.

It will be appreciated that the tube 3 may be connected by a butt seal to a vacuum device (or may itself be an integral part of the device). The device can then be rotated through any desired angle, and can also be swung about the ball 8 through a limited angle, depending on the details of the design of the joint, but which may easily be ±40°, and all this without impairing the vacuum.

The sealing washers 14, 15 and 19 may be of natural or synthetic rubber or of any other suitable smooth and resilient material. The preferred material is, however, the synthetic rubber known as neoprene. This material has been found superior to natural rubber because the latter tends to vulcanize on to the metal surfaces with which it comes into contact, but neoprene is quite free from this tendency. As already mentioned, the washers should be covered with a suitable grease. This may be a good quality vacuum grease having a melting point at about 45° C., for example. If the device is operated at a high temperature, a grease of higher melting point should be used.

The joint which has been described is adapted for the case where the internal pressure is lower than the external pressure. For the reverse condition the members of the joint must be inverted so that the sealing washer still makes contact with the ball on the high pressure side, and means for preventing the ball tube from being driven outwards by the internal pressure should be appropriately provided.

An articulated system of three or more tubes could be constructed by connecting each successive pair of tubes by a joint according to the invention. This would permit any desired degree of freedom of movement for an apparatus connected to a fixed pump, for example.

Among the advantages of the articulated joint according to the invention may be mentioned the following:

1. It may be used to permit part of an electronic device to be adjusted in position with respect to other apparatus, such as a large focussing magnet, without breaking the vacuum.

2. It may be used as part of a rotating automatic pumping system.

3. It may be used to take up any movement between pumps and apparatus.

4. By providing several such joints in tandem any degree of freedom of movement for the apparatus can be obtained without breaking the vacuum.

What is claimed is:

1. A gas-tight articulated joint for an envelope intended to be exhausted, comprising a hollow hemispherical ball provided with a co-axial tube communicating with the inside thereof, the said ball being supported inside a tubular socket on a universal pivot, the said pivot being at the centre of the ball and on the axis of the socket, and an annular sealing washer of resilient material surrounding the tube and clamped around the end of the socket and adapted to be pressed against the external surface of the ball by the external pressure.

2. A gas-tight articulated joint for an envelope intended to be exhausted, comprising a hollow hemispherical ball provided with a co-axial tube communicating with the inside thereof, the said ball being supported inside a tubular socket on a universal pivot, the said pivot being at the center of the ball and on the axis of the socket, and an annular sealing washer of resilient material surrounding the tube and clamped around the end of the socket and adapted to be pressed against the external surface of the ball by the external pressure, said pivot comprising a steel ball supported on a spider fixed transversely across the inside of the socket and cooperating with a central conical bearing in a second spider fixed transversely across the inside of the ball.

3. In an articulated joint a tubular coupling having an internal screw threaded spider and a screw threaded annulus, a tubular member comprising the ball element of a ball and socket joint, having an internal spider with a conical socket adapted to serve as a seat for a thrust bearing, a screw threaded ring adapted for sealing assembly with said annulus and to enclose said ball element comprising a socket for said ball element, a screw threaded thrust rod adapted to be threaded into said spider and having a ball bearing adapted to be seated in said spider socket, retainers adapted for mounting on the socket spider for cooperation with the thrust bearing, and means to seal the joint comprising a flexible washer overlapping the joint on the high pressure side and bearing edgewise on the ball.

4. In an articulated joint a threaded tubular coupling having an internal screw threaded support, a tubular member comprising the ball element of a ball and socket joint having an internal support with a conical socket adapted to serve as a seat for a thrust bearing, a threaded ring adapted for sealed assembly with said tubular coupling adapted to enclose said ball element comprising a socket for said ball element, a screw threaded thrust rod adapted to be threaded into said threaded support and having a ball bearing adapted to be seated in said conical socket, retainers adapted for mounting on the socket support for cooperation with the thrust bearing, and means to seal the joint comprising a flexible washer overlapping the joint on the high pressure side and bearing edgewise on the ball.

5. In an articulated joint a tube having an internal support, a tubular member comprising the element of a joint having an internal conical socket adapted to serve as a seat for a thrust bearing, a ring adapted for sealed assembly with said tube comprising a cooperating joint element, a thrust rod adapted to be adjustably mounted in said internal support and having a bearing adapted to engage said conical socket, means to imprison the thrust bearing, and means to seal the joint comprising a flexible washer overlapping the joint on the high pressure side and bearing edgewise on the ball.

6. An articulated joint comprising a tubular member having an inwardly directed, circular bearing surface, a tube extending therethrough having a ball member adapted to engage said surface, means to hold the joint in assembled relation comprising an adjustable thrust bearing, and means to seal the joint comprising a flexible washer sealed against one of said joint members and bearing upon the other.

7. An articulated joint comprising tubular members one of which has a ball and a concentric socket, and the other of which has a socket and a concentric ball, the ball of one of said members being adjustable and the socket of the other of said members being adjustable.

8. An articulated joint comprising a plurality of ball and socket members concentrically arranged, and means to seal the joint comprising an annular flexible washer adapted to be sealed upon one member of the external joint on the high pressure side thereof and to be held by said pressure in sealing relation against the other member of said joint.

9. An articulated joint comprising an internal ball and socket and an external ball concentric therewith, means to retain the internal ball in its socket, means to adjust the internal ball and socket with respect to its support, and means to seal the external ball comprising a circumscribing flange and a flexible washer sealed thereupon and bearing upon the external ball.

10. A sealed joint comprising a tubular member having a demi-spherical part, a circumscribing tubular member, an annular flexible washer having a rectangular edge one surface of which makes an angle of about 45 degrees with the cone tangent to the ball at the point where the ball is engaged by the washer, said washer being sealed against said circumscribing tubular member and bearing upon said demi-spherical part.

ROGER NORMAN HALL.

REFERENCES CITED

The following references are of record in the file of this patent:

UNITED STATES PATENTS

| Number | Name | Date |
|---|---|---|
| 308,355 | Gleason | Nov. 25, 1884 |
| 746,994 | Robinson | Dec. 15, 1903 |
| 2,040,008 | Kreidel | May 15, 1936 |
| 2,178,206 | Katcher | Oct. 31, 1939 |